May 14, 1968  J. A. POIRRIER  3,382,757
ROCKET CHARGE INSPECTION INSTRUMENT INCLUDING
A CARRIAGE CARRYING AN ANGLED REFLECTOR
WHICH IS MOVABLE ALONG A BORE
Filed Nov. 7, 1963  2 Sheets-Sheet 1

INVENTOR.
JAMES A. POIRRIER

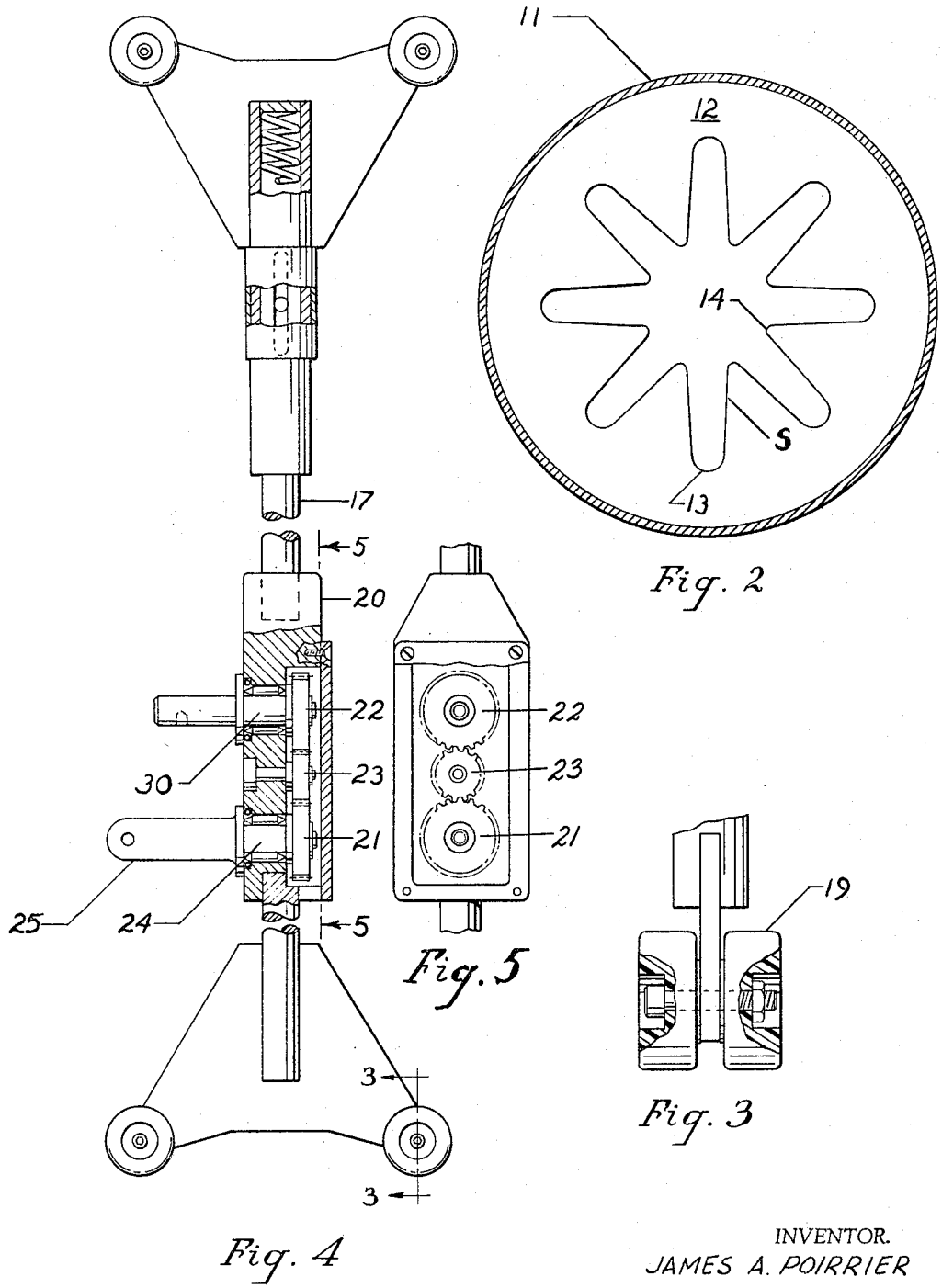

United States Patent Office 3,382,757
Patented May 14, 1968

3,382,757
ROCKET CHARGE INSPECTION INSTRUMENT INCLUDING A CARRIAGE CARRYING AN ANGLED REFLECTOR WHICH IS MOVABLE ALONG A BORE
James A. Poirrier, Jekyll Island, Ga., assignor to Thiokol Chemical Corporation, Bristol, Pa., a corporation of Delaware
Filed Nov. 7, 1963, Ser. No. 322,202
2 Claims. (Cl. 88—14)

ABSTRACT OF THE DISCLOSURE

An apparatus for inspecting the ignition surfaces of a rocket motor solid propellant including a wheeled carriage for traversing the surface to be inspected, a sectioned control rod attached to the carriage and extensible exteriorly of the motor for moving the carriage, a cantilevered beam in the carriage having appropriate light sources and angled mirrors and a telescope mounted on the motor for close inspection, in combination with the mirrors and light sources, of the ignition surfaces as the carriage is moved thereover by means of the sectional control rod from outside the motor.

---

The present invention relates to inspecting devices, more particularly it pertains to a device adapted for the visual inspection of the interiors of cylindrical articles such as rocket motors and the like.

In solid rocket motors, as opposed to liquid propellant engines, the rocket charge or propellant is cast in the rocket motor casing, cured and stored. Before the motors are stored, the propellant charge must be inspected for defects such as slumps, cracks, etc., especially in the ignition surface thereof.

The surface of a solid propellant rocket charge is carefully designed to produce the quantity of gas desired for creating the proper operating pressure of the rocket motor. Any surface irregularities in the propellant will result in an increase in the burning surface thereof, and ultimately in an undesirable increase in internal pressure culminating in the destruction of the rocket motor, per se. Consequently, detection of defects in the ignition surface of the propellant is highly desirable.

For reasons set forth above, it is quite apparent that the ignition usrface of rocket propellant charges should be carefully inspected after the casting and curing and prior to the storage of the rocket motor. Further, since the aging effects of many propellants are unknown, inspection of the propellant ignition surfaces should also be made periodically during the storage of rocket motors.

Up to the present time, the inspection operations are usually carried on by the use of radiation apparatus. Inspection devices of this type are not only expensive but also involve the use of expensive equipment to protect personnel from overexposure to harmful radiation. Increased costs are further incurred in the special training of personnel in the use of this expensive equipment and in related maintenance costs thereof.

An object of the invention it to provide a bore inspecting instrument capable of providing a quick and easy inspection of a bore from the outside.

Another object of the invention is to provide a device whereby the condition of the ignition surface may be visually observed.

Yet another object of the invention is to provide an inspecting instrument whereby cracks may be visually observed.

Still another object of the nivention is to provide a bore inspecting instrument capable of being inserted into the igniter port of a rocket engine.

A further object to the invention is to provide an inspecting instrument which can be used to inspect the entire surface of a bore.

A still further object of the invention is to provide an inspecting device of the type described which is of a simple, compact and rugged construction, relatively economical to manufacture, non-hazardous to use and reliable in operation.

With the foregoing and other objects in view, which will be made manifest in the following detailed description and specifically pointed out in the appended claims, reference is had to the accompanying drawings for an illustrative embodiment of the invention wherein:

FIGURE 2 is a sectional view of a solid propellant rocket motor wherein a typical star shaped cross section propellant charge is illustrated;

FIGURE 3 is a sectional view taken on a line 3—3 of FIGURE 2;

FIGURE 4 is a fragmentary sectional view of the apparatus;

FIGURE 5 is a sectional view taken on line 5—5 of FIGURE 4.

Figure 1:
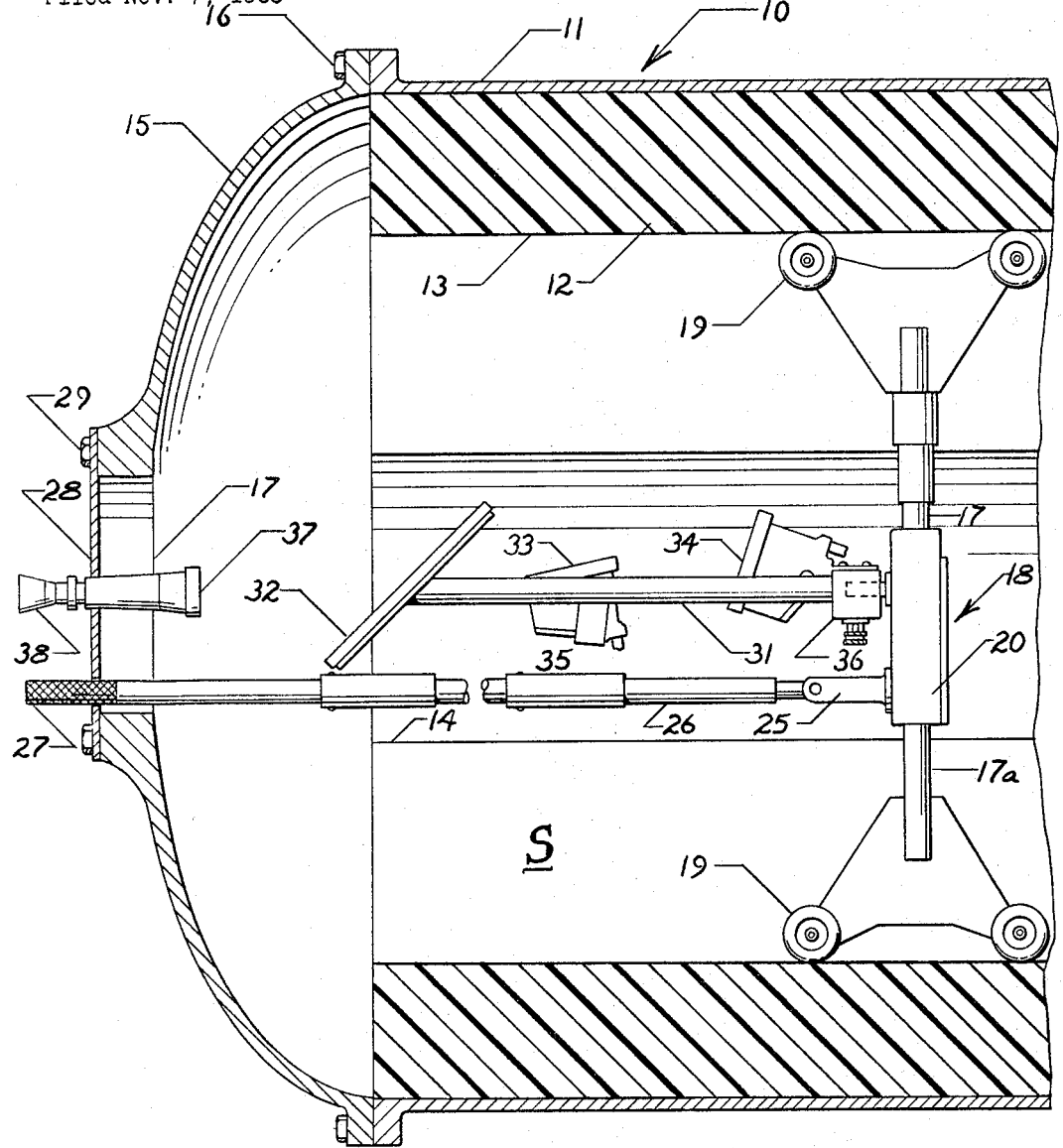
FIGURE 1 is a perspective view of a rocket charge inspecting instrument embodying the features of my invention.

Referring first to the construction shown in FIGURE 1, there is illustrated a rocket motor 10 and a rocket motor casing 11 with its propellant charge 12. The configuration of propellant charge 12 is better shown in FIGURE 2 wherein a star valley is depicted at 13 and a star point at 14 while the entire ignition surface is designated by a letter S.

Head end of rocket motor 10 is shown in FIGURE 1 with a head end closure 15 affixed to rocket motor casing 11 by means of bolts 16. The central portion of head end closure 15 has an igniter port or opening 17. In larger rocket motors, such as the Minuteman, the entire igniter assembly is inserted through this port or opening for ignition thereof.

Within rocket motor 10, there is mounted a wheeled carriage assembly 18 adapted to traverse the ignition surface S parallel to the longitudinal axis of the motor. Carriage assembly 18 is provided with a pair of legs 17 and 17a, at least one of which is spring loaded. The other leg 17a is integral with carriage assembly 18. Both legs 17 and 17a terminate in a set of plastic wheels 19 (see FIGURE 3) which are adapted to ride in star valleys 13 to be explained hereinafter.

Referring now to FIGURE 2, there is shown an end view of rocket propellant charge 12 with rocket motor casing 11 in section. This view clearly shows the star configuration of a solid propellant charge. Of course, many other configurations may be employed varying in the number of star valleys and points. As is well known in the art, the specific shape or configuration of the burning surface is a determining factor of the burning rate of the propellant.

FIGURE 3 shows plastic wheels 19 which ride in star valleys 13 of propellant charge 12. Wheels 19 are preferably made from "Teflon" or other plastic materials readily available.

Centrally located between and connecting legs 17 and 17a is a transmission housing 20. Located in housing 20 (see FIGURE 4) is a gear train comprised of gears 21, 22 and 23 which are driving, driven and idler gears respectively.

Gear 21 has a shaft 24 rotatably mounted in housing 20. Shaft 24 (see FIGURE 1) is integral with shaft 25 and releasably connects with a sectional rod 26 which terminates in a knurled handle portion 27. Sectional rod 26 is comprised of separate sections or segments for the purpose of assembling thereof by the addition of sections, as desired, so that propellant surface S may be entirely traversed for inspection purposes.

Handle portion 27 extends through an aperture in plate 28, mentioned above, which is secured to head end closure 15 by bolts 29. This plate permits my inspection device to be easily pushed along the ignition surface in a straight-away manner, since it prevents sidewise movement of handle portion 27 and sectional rod 26.

Integral with gear 22 (see FIGURE 4), there is a shaft 30 which extends from transmission housing 20 parallel to shaft 25. Connected to shaft 30 is a cantilevered beam 31 (see FIGURE 1) which extends parallel to sectional rod 26. On the free end of cantilevered beam 31 there is attached a mirror 32. Located on beam 31 between mirror 32 and housing 20 are two explosion proof, self-contained sources of light 33 and 34 of the type well known in the art. The lights are adjustably secured to cantilevered beam 31 by means of screw clamps 35 and 36, respectively. Light source 33 is positioned at an angle almost normal to the ignition surface while light source 34 is almost parallel to said ignition surface. The first light source concentrates its light upon a small area at almost a right angle thereto such that slight cracks and imperfections in propellant ignition surface S can be readily viewed and detected while the second light source 34 casts its light almost parallel to propellant ignition surface S such that slumps and other imperfections of the type not amenable to detection by the first light source will now be readily spotted. Further, it can be readily seen that the angularity of lights 33 and 34 can be varied with respect to propellant ignition surface S such that a minute inspection can be effected.

Centrally located in plate 28 there is an aperture or opening for a telescope 27 which is in a line with mirror 32 for viewing thereof.

The operation of the device is as follows: The device as depicted in FIGURE 1 is inserted into rocket motor 10 such that wheels 19 ride in star valleys 13 of propellant charge 12. With sectional rod 26 protruding outside the rocket motor, head end closure 12 with plate 28 is secured by bolts to rocket motor casing so that rod 26 is inserted through aperture in plate 28.

Now, by manually rotating handle portion 26, cantilevered beam 31 with lights 33 and 34 and mirror 32 are also rotated so that the entire ignition surface can be efficiently inspected for cracks, slumps and other defects. Additional sections may be added to sectional rod 26 as desired, by use of a detent connecting means, well known in the art so that the inspection instrument will now be capable to traverse the entire length of rocket motor 10. As the inspection instrument is rotated and moved forward, the operator looks through the eye piece 38 at mirror 32 to observe the condition of the ignition surface. This operation is repeated until the entire propellant ignition surface has been inspected.

While the invention has been described in the terms of the preferred embodiment thereof, it is understood that considerable variation of the details disclosed might be made without departing from the true scope and spirit of the invention.

What is claimed is:

1. An appaartus for visually inspecting the ignition surfaces of a solid propellant rocket motor charge comprising, a carriage assembly, a transmission housing mounted on said carriage assembly, a telescoping, segmented rod and handle for imparting motion to said carriage assembly attached to said transmission housing, a cantilevered beam rotatably secured to said transmission housing and extensible therefrom in a direction parallel to the longitudinal axis of said charge, a mirror angularly positioned on said cantilevered beam at one end thereof, a first self-contained light source on said cantilevered beam adapted to illuminate said propellant charge surface at a high angle of incidence, a second self-contained light source illuminating said propellant charge surface at a low angle of incidence, both said light sources cooperatively illuminating said surface to facilitate detection of irregularities therein, a telescope positioned at the head end of said rocket motor containing said propellant charge for receiving light rays reflected by said mirror, said light rays emanating from said charge surface and said light sources, and said cantilevered beam rotatable about its own longitudinal axis in response to rotation of said segmented rod, said rotation being effected through said transmission housing.

2. An apparatus according to claim 1 including a pair of supporting legs secured to said transmission housing, at least one of said legs being spring biased for traversing the interior surface of said propellant charge.

No references cited.

JEWELL H. PEDERSEN, *Primary Examiner.*

O. B. CHEW, *Assistant Examiner.*